US011600865B2

(12) United States Patent
Pasma et al.

(10) Patent No.: US 11,600,865 B2
(45) Date of Patent: Mar. 7, 2023

(54) RECHARGEABLE BATTERY FEATURES AND COMPONENTS

(71) Applicant: Apple Inc., Cupertino, CA (US)

(72) Inventors: Christopher R. Pasma, Redwood City, CA (US); YooEup Hyung, San Jose, CA (US); Brian K. Shiu, Sunnyvale, CA (US); Stephen J. Wisler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 16/600,815

(22) Filed: Oct. 14, 2019

(65) Prior Publication Data

US 2020/0044289 A1 Feb. 6, 2020

Related U.S. Application Data

(63) Continuation of application No. 16/037,468, filed on Jul. 17, 2018, now Pat. No. 10,446,876, which is a continuation of application No. 15/795,913, filed on Oct. 27, 2017, now Pat. No. 10,431,853.

(60) Provisional application No. 62/500,271, filed on May 2, 2017.

(51) Int. Cl.
*H01M 10/0587* (2010.01)
*H01M 4/36* (2006.01)
*H01M 50/56* (2021.01)
*H01M 50/116* (2021.01)
*H01M 50/166* (2021.01)
*H01M 50/171* (2021.01)
*H01M 50/531* (2021.01)
*H01M 4/02* (2006.01)

(52) U.S. Cl.
CPC ......... *H01M 10/0587* (2013.01); *H01M 4/36* (2013.01); *H01M 50/116* (2021.01); *H01M 50/166* (2021.01); *H01M 50/171* (2021.01); *H01M 50/531* (2021.01); *H01M 50/56* (2021.01); *H01M 2004/028* (2013.01); *H01M 2220/30* (2013.01)

(58) Field of Classification Search
None
See application file for complete search history.

(56) References Cited

U.S. PATENT DOCUMENTS

| 5,462,820 | A | 10/1995 | Tanaka | |
| 7,462,416 | B2 | 12/2008 | Kim | |
| 2003/0077511 | A1* | 4/2003 | Mizuno | H01M 50/183 429/181 |
| 2008/0089011 | A1* | 4/2008 | Tasei | H01M 50/147 361/502 |
| 2009/0029240 | A1 | 1/2009 | Gardner et al. | |
| 2010/0136421 | A1 | 6/2010 | Hermann et al. | |
| 2010/0227217 | A1 | 9/2010 | Masato et al. | |
| 2010/0279170 | A1 | 11/2010 | Lee et al. | |
| 2010/0285342 | A1 | 11/2010 | Lee et al. | |
| 2011/0076532 | A1 | 3/2011 | Ha | |
| 2011/0183164 | A1 | 7/2011 | Wu | |
| 2012/0135285 | A1* | 5/2012 | Iwama | H01M 10/0431 429/94 |
| 2013/0280570 | A1 | 10/2013 | Jong | |
| 2013/0316209 | A1 | 11/2013 | Masumoto | |
| 2014/0186692 | A1 | 7/2014 | Kim et al. | |
| 2014/0242448 | A1* | 8/2014 | Kakinuma | H01M 50/116 429/174 |
| 2015/0357679 | A1 | 12/2015 | Sano et al. | |
| 2016/0177136 | A1* | 6/2016 | Park | C09J 7/38 429/174 |
| 2018/0323475 | A1 | 11/2018 | Pasma et al. | |

FOREIGN PATENT DOCUMENTS

| CN | 1455962 | A | 11/2003 |
| CN | 101079475 | A | 11/2007 |
| CN | 102005598 | A | 4/2011 |
| CN | 103370815 | A | 10/2013 |
| CN | 104904058 | A | 9/2015 |
| JP | 11-265703 | | 9/1999 |

(Continued)

OTHER PUBLICATIONS

International Search Report and Written Opinion dated Aug. 23, 2018 in International Patent Application No. PCT/US2018/028493, 9 pages.
Office Action dated Jan. 28, 2019 in U.S. Appl. No. 15/795,913, 18 pages.
Non-Final Office Action dated Jan. 28, 2019 in U.S. Appl. No. 16/037,468. 13 pages.
Notice of Allowance dated Jun. 6, 2019 in U.S. Appl. No. 16/037,468. 8 pages.

(Continued)

*Primary Examiner* — Anca Eoff
(74) *Attorney, Agent, or Firm* — Kilpatrick Townsend & Stockton

(57) ABSTRACT

Energy storage devices, battery cells, and batteries of the present technology may include a housing characterized by a first end and a second end opposite the first end. The housing may include a circumferential indentation proximate the first end. The housing may define a first interior region between the first end and the circumferential indentation, and the housing may define a second interior region between the circumferential indentation and the second end. The batteries may include a set of electrodes located within the housing. The set of electrodes may be positioned within the second interior region of the housing. The batteries may include a cap at least partially contained within the first interior region of the housing. The batteries may also include a first insulator positioned within the housing. The first insulator may extend across the circumferential indentation from the cap to the set of electrodes.

10 Claims, 5 Drawing Sheets

(56) References Cited

FOREIGN PATENT DOCUMENTS

| JP | 2000182592 A | 6/2000 |
|----|--------------|--------|
| JP | 2007-012631  | 1/2007 |
| KR | 20110039992 A | 4/2011 |
| KR | 20120095039 A | 8/2012 |
| KR | 20150043016 A | 4/2015 |

OTHER PUBLICATIONS

Notice of Allowance dated May 20, 2019 in U.S. Patent Application No. 15/795,913.00 8 pages.
Invitation to Pay Additional Fees and Partial Search Report dated Jun. 21, 2018 in PCT Application No. PCT/US2018/028493. 19 pages.
Chinese Patent Application No. 201880029118.3, Office Action, dated Sep. 17, 2021, 10 pages.
Application No. CN201880029118.3 , Office Action, dated Mar. 3, 2022, 5 pages.
Application No. CN201880029118.3, Office Action, dated Jun. 22, 2022, 11 pages. English Translation begins on p. 6.
"Notice of Decision to Grant (no translation)," dated Nov. 4, 2022 in Chinese Patent Application No. 201880029118.3. The English translation to the allowed claims are attached. 5 pages.

\* cited by examiner

RECHARGEABLE BATTERY FEATURES AND COMPONENTS

RELATED APPLICATIONS

This application is a continuation of U.S. application Ser. No. 16/037,468, filed Jul. 17, 2018, which is a continuation of U.S. application Ser. No. 15/795,913, filed Oct. 27, 2017 now U.S. Pat. No. 10,431,853, issued Oct. 1, 2019, which claims the benefit of U.S. Provisional Application No. 62/500,271, filed May 2, 2017, which are hereby incorporated by reference in their entireties for all purposes.

TECHNICAL FIELD

The present technology relates to batteries and battery components. More specifically, the present technology relates to features and components of a rechargeable battery.

BACKGROUND

In battery-powered devices, active device use can produce scenarios enhancing wear on the device. Batteries within the device may be exposed to more intense circumstances and environments than predecessor designs. Improved designs are needed.

SUMMARY

The present technology relates to energy storage devices, including battery cells and batteries, which may include a housing characterized by a first end and a second end opposite the first end. The housing may include a circumferential indentation proximate the first end. The housing may define a first interior region between the first end and the circumferential indentation, and the housing may define a second interior region between the circumferential indentation and the second end. The batteries may include a set of electrodes located within the housing. The set of electrodes may be positioned within the second interior region of the housing. The batteries may include a cap at least partially contained within the first interior region of the housing. The cap may be characterized by a first surface facing the set of electrodes. The batteries may also include a first insulator positioned within the housing. The first insulator may extend across the circumferential indentation from the cap to the set of electrodes. The first insulator may be characterized by a first outer radius at a first end proximate the cap, and the first insulator may be characterized by a second outer radius greater than the first outer radius at a second end proximate the set of electrodes.

In some embodiments, the set of electrodes may include a separator defining a height of the set of electrodes. The first insulator may be positioned within the housing in contact with the separator. The first insulator may compress the separator within the housing. The first insulator may be characterized by a chamfered edge extending to the first end of the first insulator. The first insulator may be of a size configured to maintain a portion of the first insulator characterized by the chamfered edge between the circumferential indentation of the housing and an exterior component of the set of electrodes at all times. The batteries may further include an electrode tab extending between and contacting both the set of electrodes and the cap. The electrode tab may be coupled with the cap along the first surface of the cap at a first end of the electrode tab, and the first end of the electrode tab may be characterized by chamfered edges. The electrode tab may be fixedly coupled with the cap at a position on the electrode tab centrally located between the chamfered edges.

Exemplary batteries may further include an electrode tab coupled between the set of electrodes and an interior surface of the housing. The electrode tab may be coupled with the housing in the second interior region proximate the circumferential indentation. The coupling of the electrode tab may include a three-point weld. The electrode tab may be fixedly coupled with an anode current collector of the set of electrodes along a first surface of the anode current collector. An insulating tape may be positioned on a second surface of the anode current collector opposite the first surface over a portion of the anode current collector to which the electrode tab is coupled. The insulating tape may extend along the second surface of the anode current collector towards an anode active material located on the second surface of the anode current collector. The batteries may also include a second insulator positioned along a base of the housing between the set of electrodes and the housing. The second insulator may be characterized by an outer diameter less than an outer diameter of the set of electrodes. The set of electrodes may include a rolled configuration including coupling material extending about an exterior surface of the set of electrodes and characterized by a first end of the coupling material overlapping a second end of the coupling material. In embodiments, the battery may include a rolled configuration, and may include a cathode current collector. The battery may also include a cathode active material positioned on a portion of the cathode current collector. The battery may further include an insulating tape covering an end of the cathode active material and extending to an exterior edge along a length of the cathode current collector.

The present technology may also encompass batteries including a set of electrodes. The batteries may include a cap. The batteries may further include an electrode tab coupled with the set of electrodes at a first end of the electrode tab. A first surface of the electrode tab may be coupled with a surface of the cap at a second end of the electrode tab. The second end of the electrode tab may be contained within an insulative material.

In some embodiments, a first window may be defined within the insulative material along the first surface of the electrode tab. The first window may expose a portion of the electrode tab. The electrode tab may be coupled with the cap at the portion of the electrode tab exposed by the window defined within the insulative material. The insulative material may extend along the first surface of the electrode tab entirely about an exterior of the window. The electrode tab may be further characterized by a second surface opposite the first surface of the electrode tab. The electrode tab may be characterized by at least one sidewall extending between the first surface and the second surface. The insulative material may extend along the at least one sidewall. The insulative material may extend about the second surface of the electrode tab. A second window may be defined in the insulative material along the second surface. The second window may be located along the second surface opposite a position of the first surface where the first window is defined in the insulative material.

The present technology may also encompass batteries including a housing characterized by a first end and a second end opposite the first end. The housing may include a circumferential indentation proximate the first end. The housing may define a first interior region between the first end and the circumferential indentation. The housing may also define a second interior region between the circumferential indentation and the second end. The batteries may include a set of electrodes located within the housing, and the set of electrodes may be positioned within the second interior region of the housing. The batteries may include a cap at least partially contained within the first interior region of the housing. The cap may be characterized by a first surface facing the set of electrodes. The batteries may include a first electrode tab coupled with the set of electrodes at a first end of the electrode tab. A first surface of the electrode tab may be coupled with a surface of the cap at a second end of the electrode tab. The second end of the electrode tab may be contained within an insulative material. A first window may be defined within the insulative material along the first surface of the electrode tab. The first end of the electrode tab may be characterized by chamfered edges.

The batteries may include a second electrode tab coupled between the set of electrodes and an interior surface of the housing. The electrode tab may be coupled with the housing in the second interior region proximate the circumferential indentation. The batteries may also include a first insulator positioned within the housing. The first insulator may extend across the circumferential indentation from the cap to the set of electrodes. The first insulator may be characterized by a first outer radius at a first end proximate the cap. The first insulator may be characterized by a second outer radius greater than the first outer radius at a second end proximate the set of electrodes.

Such technology may provide numerous benefits over conventional technology. For example, the present devices may expand and enhance insulation between components operating at different potential. Additionally, the designs may improve hardware configurations for smaller batteries. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
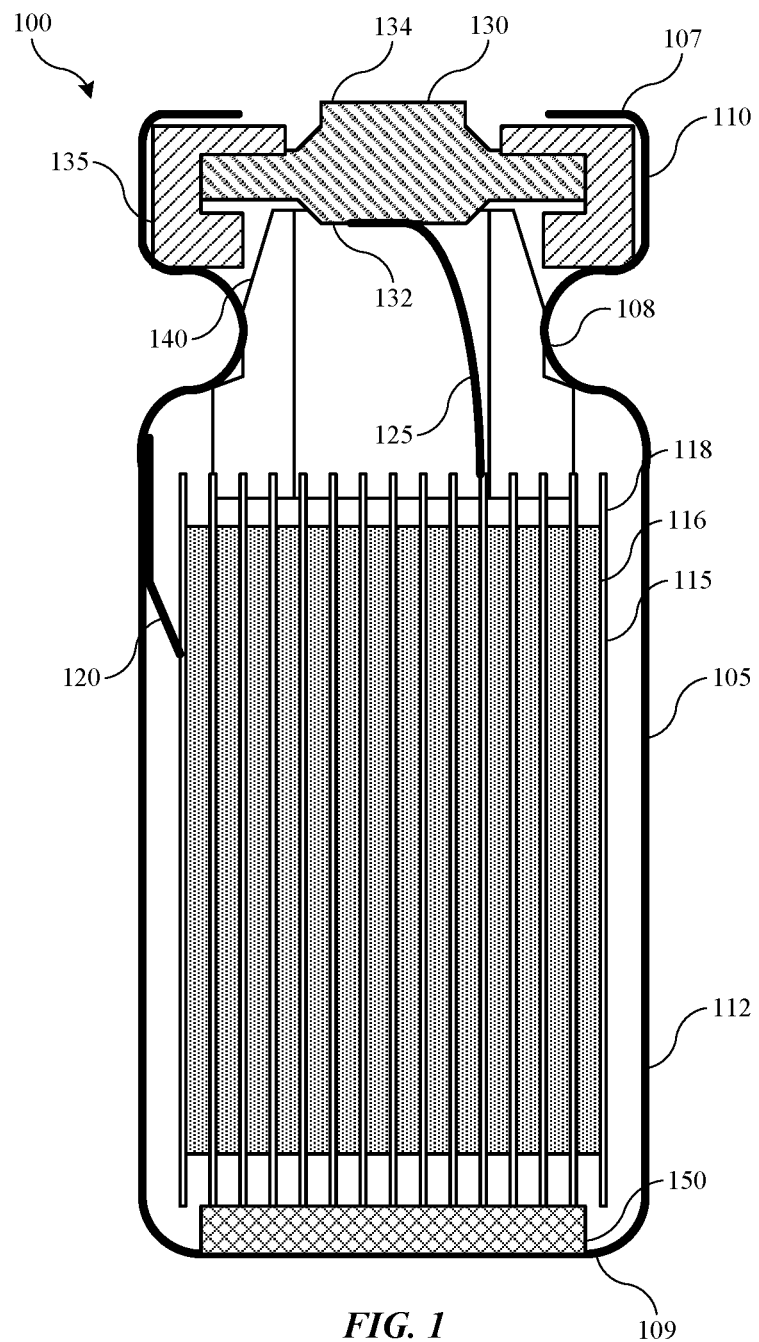
FIG. 1 shows a schematic cross-sectional view of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be made from a host of materials. As battery-powered devices continue to shrink, internal batteries that power them are forced into ever smaller form factors as well. In one sense, a battery may be reduced in size by reducing capacity, or more specifically reducing the amount of active material contained within the battery. However, as consumers continue to expect longer time of use in smaller designs, the amount of active material within a battery not only may be maintained, but designs may seek to increase both the volume occupied by active material and the amount of power produced by the active material. Because of the tension between volume within a battery and amount of space that may be used for active material, space within the battery for other components may be constrained even more.

In tandem with the physical reduction in device size is the more robust use of devices. From phones, media players, and fitness devices, to wireless components that may be used in conjunction with the devices, consumers are utilizing devices in daily activities that can expose the devices to more intense conditions, including more routine bumping, dropping, weather exposure, as well as almost constant use. This may require more robust designs and components for both the general device and the battery contained within the device. When the devices being powered are small, such as watches and fitness devices, or wireless devices requiring dedicated batteries such as earphones and health monitors, more robust designs can be difficult to produce when the scale of the battery may be a few millimeters or less.

The present technology addresses many of these issues by incorporating features and components that may produce more robust battery designs, while limiting volume occupied by components aside from the cell material. Many of the batteries described may be on a scale of a few millimeters or less, and internal components may be even smaller. By utilizing particular components and configurations as described throughout the application, the present technology may provide more robust designs that maintain high capacity for long periods of use.

Although the remaining portions of the description will routinely reference batteries that may be on a relatively small scale, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, wireless accessories including monitors, earphones, and speakers, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 shows a schematic cross-sectional view of an energy storage device 100 according to embodiments of the present technology. FIG. 1 illustrates a cylindrical battery, which may be a rechargeable battery in embodiments, although energy storage device 100 may also be a primary battery, such as an alkaline battery. Energy storage device 100 may be partially or substantially cylindrical, although in embodiments energy storage device 100 may be rectilinear. In embodiments in which energy storage device 100 is rechargeable, the device may include a number of battery cell designs including a rolled configuration, such as a jelly roll as illustrated, although the battery cell may also be a stacked, prismatic, or pouch-style cell in other embodiments. Energy storage device 100 may include a housing 105. Housing 105 may include a first end 107 and a second end 109 in embodiments.

Housing 105 may also define a circumferential indentation 108. Indentation 108 may extend entirely about housing 105, and may be an annular indentation, although in other geometries the indentation may include corners, such that the indentation extends about a perimeter of the housing. The indentation 108 may be beading, necking, or some other restriction formed about the housing 105. Housing 105 may define one or more interior regions within the housing. For example, housing 105 may define a first interior region 110 that may be located between the first end 107 and the circumferential indentation 108. Housing 105 may also define a second interior region 112 between the circumferential indentation 108 and the second end 109. Housing 105 may be or include a pouch, a shell, an enclosure, or a hard-casing in embodiments. Housing 105 may be made of insulative materials, conductive materials, or conductive materials with an outer casing, for example. Exemplary conductive materials may be materials that are chemically stable at cathode and/or anode operating potentials, and may include aluminum, copper, stainless steel, or other metals that may operate at any particular cell potential.

A set of electrodes 115 may be located within housing 105. The set of electrodes 115 may be positioned within the second interior region 112 of the housing 105. The et of electrodes 115 may be a number of rechargeable or primary cell designs. For example, the set of electrodes 115 may be a rechargeable cell, and may be included in a rolled configuration, such as a jelly roll. The roll may include multiple layers that are then rolled, stacked, or alternated up to a particular thickness to be included within housing 105. The configuration of the set of electrodes 115 may be a jelly roll in embodiments in which housing 105 is cylindrical through second interior region 112. As illustrated, the set of electrodes 115 may include active material 116, and separator material 118. Separator material 118 may be an electrically non-conducting material that may be positioned between anode and cathode active materials, and be configured to allow ionic transport through the structure. For example, separator material 118 may be a polymer or a cellulosic material in embodiments. The active material may be disposed on current collectors described in later figures, and may include any number of materials.

The active materials may be or include any number of materials used in rechargeable batteries, and may include materials for a lithium-based system. For example, active material 116 may include an anode material and include a carbon-containing compound such as graphite or a lithium-containing compound such as lithium titanate. Any other anode materials may similarly be used with the present technology. Additionally, for example, active material 116 may include a cathode material including a lithium-containing material such as lithium cobalt oxide or lithium phosphate, among many other known lithium compounds used in such devices.

The active material 116 may also include nickel, manganese, cobalt, aluminum, and a variety of other materials that would be understood to be encompassed by the present technology. Indeed, any possible anode and cathode materials that may be incorporated within a rechargeable cell as will be described below are suitable for the present designs, and will be understood to be encompassed by the present technology.

In embodiments the set of electrodes 115 may be coupled with contacts within the battery 100. For example, a first electrode tab 120 may be an anode tab, and may be coupled with the housing 105 as will be described in more detail below. The battery 100 may also include a second electrode tab 125, which may be a cathode tab in embodiments. It is to be understood that the electrode tabs may be reversed, or otherwise coupled within the battery 100 in order to provide a positive and negative terminal. Second electrode tab 125 will also be discussed in further detail below, and in embodiments may be coupled with a cap 130. Cap 130 may be at least partially positioned within the housing 105, and may be at least partially positioned within the first interior region 110 of housing 105. Cap 130 may be characterized by a first surface 132, which may face towards the interior of the housing, and may face towards the set of electrodes 115. The cap 130 may also include a second surface 134, which may be a surface opposite first surface 132. Second surface 134 may face away from the set of electrodes, and may operate as a positive terminal, for example, during use of battery 100.

Battery 100 may include a gasket 135, which may extend about the cap 130. Gasket 135 may be annular in shape, or may be characterized by any of a variety of other geometries.

Gasket 135 may couple with cap 130 to limit or prevent contact between cap 130 and the housing 105. As cap 130 may be coupled with one of the electrode tabs of the set of electrodes, and housing 105 may be coupled with another of the electrode tabs of the set of electrodes, the two components may be configured to operate at different potentials, and may operate as the two battery terminals. Gasket 135 may operate to limit contact between the two terminals in embodiments. Gasket 135 may be a polymer, rubber, or any number of insulative materials configured to maintain cap 130 electrically decoupled from housing 105.

Battery 100 may also include insulators positioned within the device, and may include a first insulator 140, and a second insulator 150. First insulator 140 may be positioned within the housing 105. First insulator 140 may extend within both first interior region 110 and second interior region 112, and in embodiments, first insulator 140 may extend across circumferential indentation 108. First insulator 140 may extend from cap 130 to the set of electrodes 115, and may contact one or both components. In some embodiments, first insulator 140 may extend towards cap 130 without contacting the component, and may extend to at least a portion of the set of electrodes 115.

First insulator 140 may be at least partially annular to allow passage of second electrode tab 125, or first insulator 140 may define a channel through which second electrode tab 125 may pass. First insulator 140 may be characterized by an inner radius, which in embodiments may be constant through a length of the first insulator 140. First insulator 140 may also be characterized by an outer profile, which may be configured based on an interior profile of the housing 105, as well as other internal components. First insulator 140 may be characterized by a first outer radius at a first end 142 of first insulator 140, where first end 142 may be proximate cap 130. First insulator 140 may also be characterized by a second outer radius at a second end 144 of first insulator 140, wherein second end 144 may be proximate the set of electrodes 115. The second outer radius may be greater than the first outer radius in embodiments, although in other embodiments the first outer radius may be greater than or equal to the second outer radius.

As illustrated the first insulator 140 may intersect the set of electrodes 115. For example, the set of electrodes 115 may include a separator 118 as previously noted. The separator may extend laterally, in a rolled configuration, beyond the active materials 116 and current collectors. When rolled and positioned within the housing 105, the separator 118 may define a height of the set of electrodes within the housing 105, and the separator 118 may extend above and below active materials 116 and the associated current collectors. The separator 118 may be relatively thin and lenient to deflection based on multiple factors including the material of the separator as well as the thickness of the separator. The first insulator may contact the separator during formation of the battery. The formation may include a compression operation in which the first insulator 140 may provide a force against the separator 118, which may compress, deflect, or otherwise deform the separator 118 within the housing 105. This operation may not affect the active material 116, and the separator may be compressed at a height above the active materials of the set of electrodes.

Figure 2:
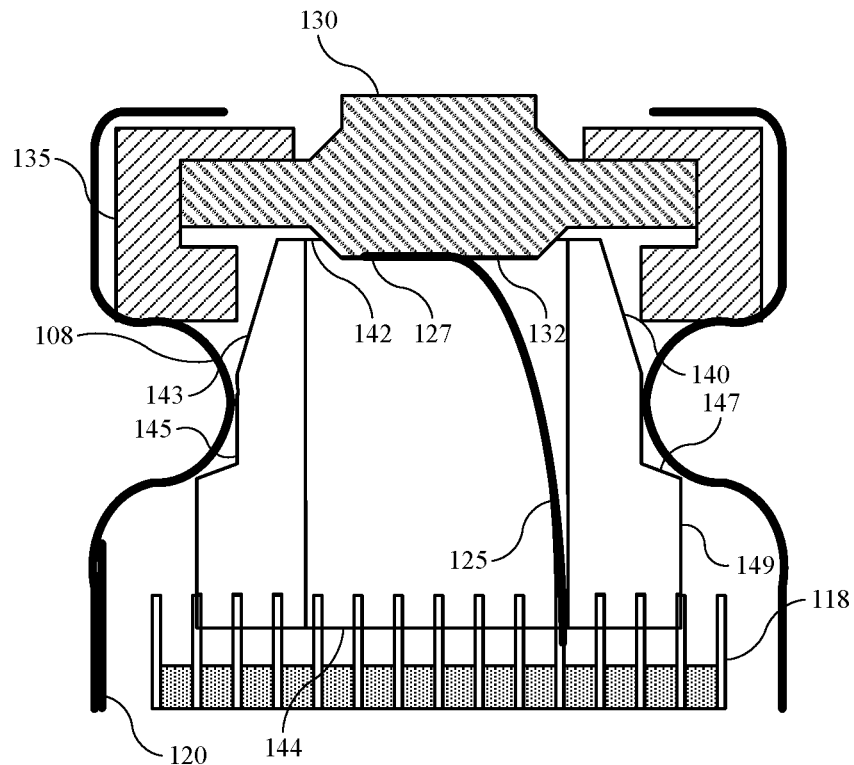
FIG. 2 shows a schematic partial cross-sectional view of an energy storage device according to embodiments of the present technology.

FIG. 2 shows a schematic partial cross-sectional view of energy storage device 100 according to embodiments of the present technology, and may show a more detailed view of first insulator 140. First insulator 140 may be characterized by a profile at an outer radius extending along the first insulator. The profile may be formed to account for characteristics of the housing and internal components of the battery. First insulator 140 may be characterized by a chamfered or sloping edge 143 extending to first end 142 of the first insulator 140. The chamfered edge 143 may begin in line with the circumferential indentation 108, and may begin below the circumferential indentation 108, such as within the second interior region 112. The chamfered edge 143 may taper towards cap 130 in embodiments. The chamfered edge 143 may allow the first insulator 140 to avoid gasket 135 in embodiments, such that the components may or may not contact one another within a sealed battery, although the components may be configured to contact each other with a minimal amount of force so as not to cause, or to cause within tolerance, an outward compression against the cap 130, housing 105, or any other component of the battery.

First insulator 140 may be further characterized by additional outer profile characteristics including a cylindrical section 145 extending from the chamfered edge 143 to an additional sloped section 147 extending radially outward of an inner surface of the circumferential indentation 108 in housing 105. The first insulator 140 may further include an additional cylindrical section 149 extending to second end 144 of the first insulator 140, which may be in contact with separator 118. In some embodiments, second end 144 may be characterized by an outer diameter less than 5 mm. Additional profiles encompassed by the present technology may be characterized by additional exterior features and geometries configured to form about aspects of the housing 105.

The first insulator 140 may be in contact with the cap 130 of the battery as well as the separator 118 of the set of electrodes. By having the components of the battery cell in contact, and possibly under compression, even a minor compression, components of the battery may be maintained in line during external events. Battery 100 may be characterized by reduced dimension in some embodiments, although battery 100 may be of almost any size. The specific configuration, however, may afford battery 100 to be on a scale of a few millimeters in diameter or smaller in some embodiments. For example, when a device containing battery 100 is dropped or bumped, the components within battery 100 may be maintained in line with each other, and may be stabilized by the contact with other components. Conventional batteries, however, may be characterized by looser tolerances, which may allow components within the battery to shift within the housing. This may include the set of electrodes 115, which may tear, or break contact with the electrode tabs if the set of electrodes shifts or moves during a drop or other event. In the present technology, the set of electrodes 115 may be maintained between one or more insulators to reduce or prevent movement during an event such as when the device housing the battery 100 is dropped.

On batteries of reduced scale without the present technology, internal movement of components, or shifting of materials, may allow second electrode tab 125 to approach or even contact circumferential indentation 108. As previously noted, these components may be operating at different potentials, and may be electrically coupled with the terminals of the battery 100. If the materials were shifted sufficiently during a drop, for example, the battery may short between the two components, which in embodiments may be only 1 mm from each other or less. First insulator 140 may prevent such an occurrence, by ensuring that at least a portion of first insulator 140 characterized by the chamfered edge 143 is maintained between the circumferential indentation of the housing 105 and an exterior component of the set of electrodes 115, such as second electrode tab 125, at all times. This may be produced by ensuring that first end 142 of first insulator 140 extends to or beyond first surface 132 of cap 130, such as is illustrated. Put another way, first surface 132 of cap 130 may extend within first insulator 140 in embodiments.

First insulator 140 may be or include a number of insulator materials, such as polymer, rubber, or some combination. For example, first insulator 140 may be a thermoplastic polymer, such as polypropylene, and may be a thermoplastic polyester elastomer. The elastomers may be any number of materials including thermoplastic copolyesters, copolymers, olefins, polyamides, or polyurethanes. By utilizing materials such as thermoplastic polyester elastomers, the first insulator 140 may be capable to flexing during battery operation, which may swell the set of electrodes, and then return to the original form.

The present technology may also adjust the electrode tabs to reduce the chance of shorting events. As previously mentioned, the second electrode tab 125 may be coupled with the cathode of the set of electrodes 115. Second electrode tab 125 may extend between the set of electrodes 115 and cap 130, and may be in contact with or coupled with each component. In some embodiments, second electrode tab 125 may be fixedly coupled with both the set of electrodes 115 at the cathode, and with cap 130. A first end 127 of second electrode tab 125 may be coupled with first surface 132 of cap 130, as illustrated in FIG. 2. Cap 130 may be characterized by a round or ovular shape in embodiments, while second electrode tab 125 may be rectilinear. For example, second electrode tab 125 may have a rectangular end, which may include corners extending beyond a radius of cap 130. The present technology may adjust the geometry of second electrode tab 125 to increase the distance between corners of the second electrode tab 125 and aspects of housing 105, including circumferential indentation 108.

Figure 3:
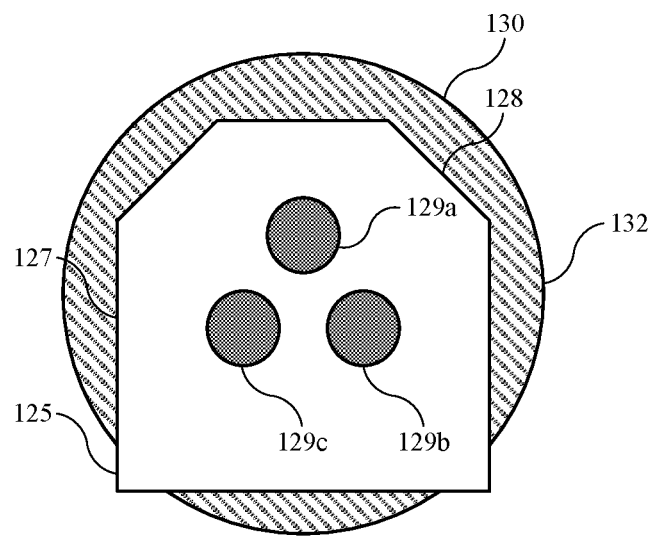
FIG. 3 shows a schematic partial view of components of an energy storage device according to embodiments of the present technology.

Turning to FIG. 3 is shown a schematic partial plan view of components of energy storage device 100 according to embodiments of the present technology. FIG. 3 illustrates a view from below cap 130, illustrating first surface 132. First portion 127 of second electrode tab 125 is also shown. The illustration includes coupling according to the present technology of an adjusted second electrode tab 125. As illustrated, second electrode tab 125 may be characterized by chamfered edges 128 along first portion 127 of second electrode tab 125. By forming chamfered edges 128, corners of first portion 127 may be removed, which may otherwise extend beyond a radius of first surface 132 of cap 130. The chamfered edges 128 may further be characterized by rounded corners to reduce sharp points. In other embodiments the tab may be characterized by an alternative geometry, such as a curved or rounded profile, which may produce the same effect. Additionally, in some embodiments, the first portion may be maintained within an outer radius of cap 130, and may have no edges or corners extending beyond the outer radius of the cap 130.

FIG. 3 also illustrates the coupling of second electrode tab 125 to cap 130, which may be performed in a variety of ways. Although an adhesive may be used in embodiments, the components may be fused or welded in embodiments to maintain conductivity between the components, or reduce resistance between the components. The coupling may utilize solder or other metal to connect the two components, or welding techniques may be used to fixedly couple the second electrode tab 125 to cap 130. An exemplary welding technique may include laser beam welding or electron beam welding, which may fuse the two components together. As illustrated, the welding may include spot welds 129 in a particular orientation.

Although any number of spot welds may be utilized, and any number of weld patterns may be formed, the coupling may include less than 5 spot welds, such as 4 welds, 3 welds, 2 welds, or 1 weld. For example, three welds may be formed in an exemplary coupling. The welding may be performed such that one weld may be centrally located between chamfered edges 128, such as weld 129a. Weld 129a relative to welds 129b-c may be positioned centrally to allow coupling closer to a top edge of second electrode tab 125. For example, weld 129a may be positioned less than 1 mm or less than 0.5 mm from an exterior edge of second electrode tab 125 in embodiments. Such a weld distance from the exterior edge may not be possible if two welds are placed adjacent one another, such as in a four weld, square pattern. In such a scenario, the welds may be placed further down the tab to avoid proximity to the chamfer. Accordingly, the second electrode tab 125 would extend further past the welds, which may again extend the tab past an outer radius of first surface 132 of cap 130.

First electrode tab 120 as illustrated in FIGS. 1 and 2 may also be manufactured for use in batteries according to the present technology. First electrode tab 120, as shown schematically in FIG. 1, may be coupled with the set of electrodes 115 and may also be coupled with housing 105. In embodiments, first electrode tab 120 may be coupled with an interior surface of battery 100. For example, first electrode tab 120 may be coupled along a sidewall of housing 105 in second interior region 112, proximate circumferential indentation 108. For example, first electrode tab 120 may be coupled adjacent circumferential indentation 108, or may be coupled along a portion of housing 105 at which circumferential indentation 108 is formed. In other embodiments first electrode tab 120 may be coupled at other locations, such as with a bottom portion of housing 105. First electrode tab 120 may be similarly shaped as second electrode tab 125, and may be characterized by a rectilinear design. Additionally, first electrode tab 120 may be planar, while in embodiments housing 105 may be characterized by a curved surface, such as with a cylindrical design.

Figure 4:
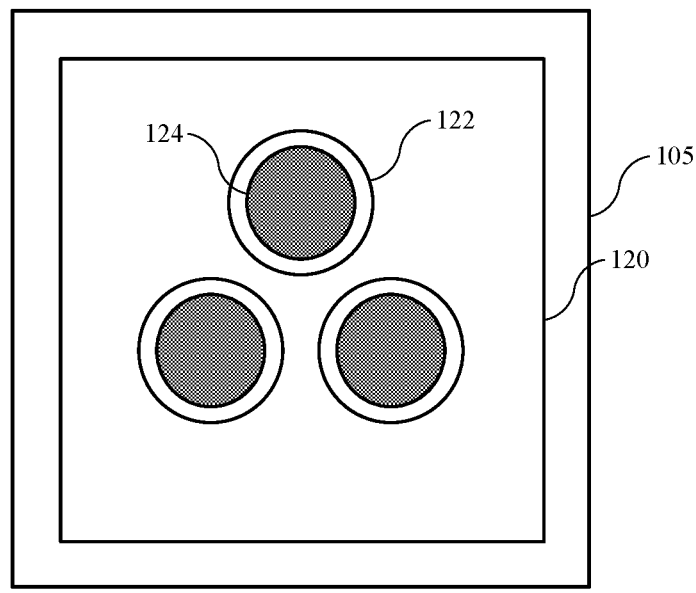
FIG. 4 shows a schematic partial view of an electrode tab of an energy storage device according to embodiments of the present technology.

Coupling of first electrode tab 120 with housing 105 may occur prior to or subsequent formation of the circumferential indentation, or beading, along the housing. Depending on the placement and coupling of the first electrode tab 120, the beading may cause further curvature of the housing 105 against the first electrode tab 120, which may provide additional stress to the manner of coupling. In embodiments, first electrode tab 120 may be welded to housing 105, or may be coupled with adhesive, fusing, or by other techniques that may produce a coupling of the two components and allow electrical conduction between them. Turning to FIG. 4 is shown a schematic partial cross-sectional view of energy storage device according to embodiments of the present technology. The figure illustrates a portion of housing 105 and first electrode tab 120. In one embodiment, projections 122 may be formed on first electrode tab 120 to provide contact points for welding or fusing. The projections 122 may facilitate contact across a more planar first electrode tab 120 with a curved housing 105.

The number of projections 122 may vary in different embodiments. In some embodiments, a number of projections 122 such as 1, 2, 3, 4, 5, 6 or more projections may be formed in any pattern across first electrode tab 120. The number of projections may affect the coupling in embodiments, based on the different surface features. For example, four projections in a square pattern may not all contact housing 105 in some embodiments, or may provide a less flush contact. When welded, such as if an electrical current is applied to the components to form a weld, the amount of contact may affect the quality or extent of the weld. When a projection 122 is not flush with the housing 105, the weld may be more superficial, or may not form at all, which may weaken the coupling of the components. The weld, which may also be formed by laser welding or any other form of welding, may be a point of resistance during a drop event, and may be a stress point. When a device is dropped, movement of the internal components may produce stress at fixed coupling positions, such as the welded projections 122. The stress produced at the weld locations may overcome the strength of the coupling, which may cause the electrode tab to buckle, break, or separate from the housing 105.

As illustrated in FIG. 4, three projections 122 may be formed instead, and nested with one another in a closer configuration than four projections in a square pattern may be. The projections in a triangular pattern may allow all three projections 122 to contact housing 105 during welding, which may ensure all three points may fully weld with housing 105 across each projection 122 at weld points 124. Accordingly, utilizing three weld points 124 may appear to reduce the weld strength compared to four, for example, but by utilizing a pattern more likely to provide flush contact on a curved surface, the three projections 122 may enable a larger area of fusion on each projection that produces a three-point weld, which may provide an improved coupling over the coupling that four projections may afford.

Figure 5:
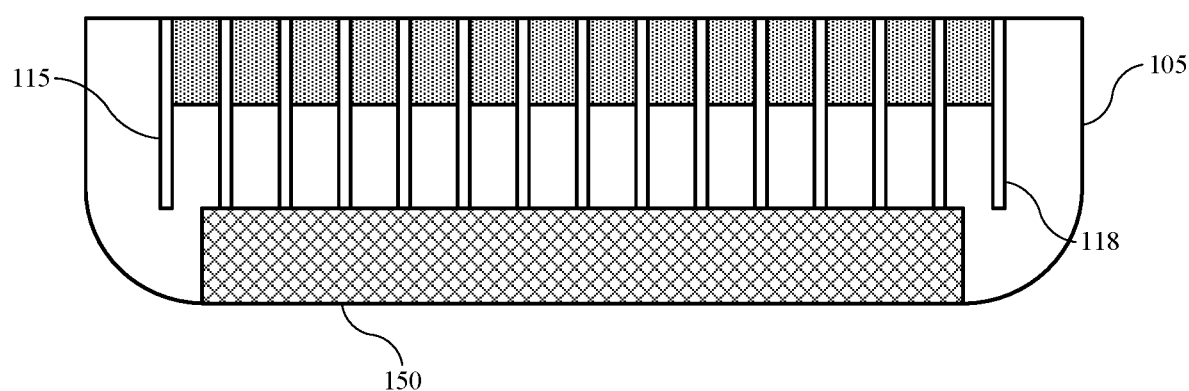
FIG. 5 shows a schematic partial cross-sectional view of an energy storage device according to embodiments of the present technology.

FIG. 5 shows a schematic partial cross-sectional view of energy storage device 100 according to embodiments of the present technology. The illustration includes a view of a lower portion of battery 100 including housing 105, the set of electrodes 115, and second insulator 150. Second insulator 150 may be any geometry corresponding to the geometry of a base of housing 105. For example, the base of housing 105 may be round or ovular, and second insulator 150 may be characterized by a similar shape, although in other embodiments rectangular or other polygonal geometries may be used. Second insulator 150 may be characterized by equivalent dimensions to the base of housing 105, or may be characterized by a radius less than a radius of the base of housing 105.

The second insulator may perform multiple functions including providing support for the set of electrodes 115, as well as maintaining an insulative surface between housing 105 and the set of electrodes 115. An outer wind of the set of electrodes 115 may include anode material, which may be at a similar potential as housing 105. However, at the exposed ends, may be access to the cathode material at different potential. Without second insulator 150, or some other insulative device, a short may occur during operation or during an event such as a drop, which may deform the separator 118 and allow contact between cathode active material and housing 105.

Based on the possible shorting path, second insulator 150 may be formed to an equivalent radius as the base of housing 105. However, such dimensions may produce a trap for air within the housing 105, or a restricted space along a curved base, which may cause the second insulator 150 to bow upward within the housing, or force the set of electrodes 115 further up within the housing. This may cause issues with closing the battery components, may deform one or more components, or may waste space within the battery, which could otherwise be used for additional capacity. Accordingly, in some embodiments, second insulator 150 may be characterized by a radius less than a radius of the base of housing 105, and may be characterized by a radius less than an outer radius of the set of electrodes 115. In some embodiments, an outer radius of the second insulator 150 may be less than or about 5 mm.

Figure 6:
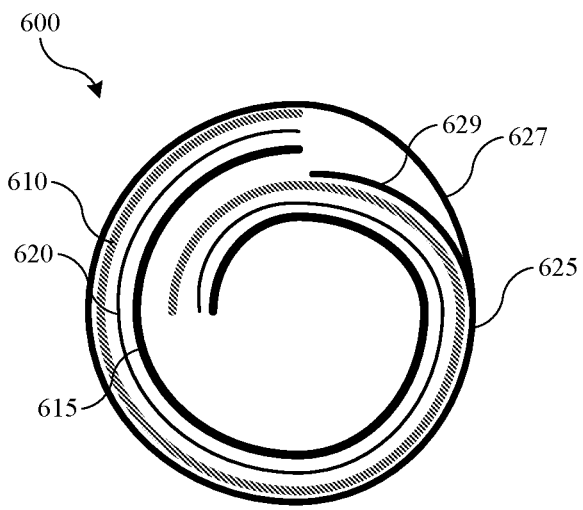
FIG. 6 shows a schematic partial view of a battery cell according to embodiments of the present technology.

FIG. 6 shows a schematic plan view of a portion of a set of electrodes 600 according to embodiments of the present technology. The set of electrodes 600 may include any of the characteristics of the set of electrodes 115 previously described. The set of electrodes 600 may include an anode active material 610, a cathode active material 615, and a separator 620. The active materials may also include the associated current collector foils. The set of electrodes 600 also illustrates a coupling material 625 that may be included about the set of electrodes 600. The coupling material may be included over a portion of the set of electrodes 600 to protect the set of electrodes and assist in maintaining the structure, such as a rolled or wound structure. The coupling material 625 may extend about a portion of the set of electrodes 600, or may extend along the entire height of the set of electrodes 600, including along a height associated with a height of the active materials across the set of electrodes. In some embodiments the coupling material, which may be any of a variety of tapes, adhesives, or sleeves, may only partially extend about a circumference of the set of electrodes 600. However, in devices for which dropping and other contact events may occur, the coupling material may extend fully about a circumference of the set of electrodes 600. In some embodiments, a first end 627 of coupling material 625 may overlap a second end 629 of coupling material 625.

During a drop or other contact event, the ability of components to shift within the battery may cause the set of electrodes to tear along one or more surfaces. When a current collector, which may be a metal foil, tears or separates, the edges or corners may be sharp enough to penetrate or cut the separator, which may allow an electrical short to occur. By extending coupling material 625 to overlap itself about the set of electrodes, the set of electrodes structure may be reinforced, which may resist tearing during events such as drops. It is to be understood that FIG. 6 is a schematic only, and is shown for exemplary use of an insulative material, and may not show an actual form of the material. For example, first end 627 may not extend as far over second end 629, and may be coupled directly after passing an outer wind of the electrode materials.

Figure 7:
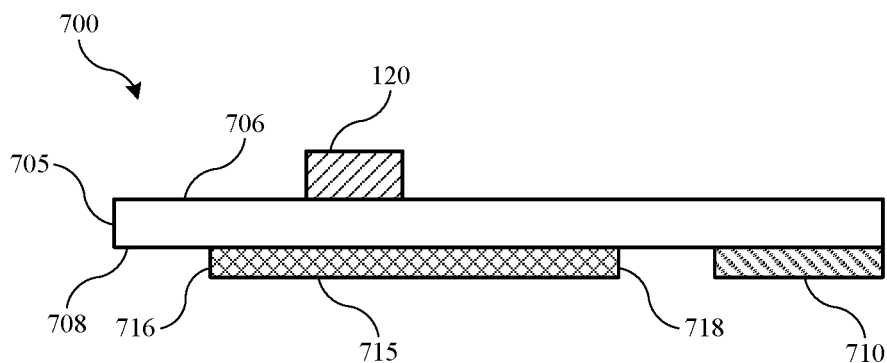
FIG. 7 shows a schematic cross-sectional view of a portion of an electrode according to embodiments of the present technology.

FIG. 7 shows a schematic cross-sectional view of a portion of an electrode 700 according to embodiments of the present technology. Electrode 700 may be part of an anode electrode structure, and may illustrate an outer portion of the anode electrode, which may be an outer wind of a jelly roll structure, for example. As illustrated in previous figures, a first electrode tab 120 may be coupled with a current collector 705, which may be the anode current collector of the set of electrodes. The electrode tab 120 may be welded, bonded, or otherwise coupled, such as fixedly coupled with the current collector 705. As illustrated, first electrode tab 120 may be coupled with a first surface 706 of current collector 705. First electrode tab 120 may be a similar or different material as current collector 705. For example, both materials may be copper, nickel, stainless steel, or some other conductive material operable at anode potential, or the components may each be one of these materials and be different from one another.

Current collector 705 may also be characterized by a second surface 708 opposite the first surface 706. An insulating material 715, such as a tape, may be applied along second surface 708, and may be positioned on the second surface 708 over a portion of the current collector 705 to which first electrode tab 120 is coupled. First electrode tab 120 may be coupled with current collector 705 in many ways, such as welding, bonding, fusing, or by some other coupling. For example, first electrode tab 120 and current collector 705 may be welded together with an ultrasonic weld to attach the first electrode tab 120 to the current collector 705. Ultrasonic welding may create surface roughness or burs along current collector 705 where the welding occurs, and may also produce burs or roughness on the second surface 708 opposite the location of the weld. Insulating material 715 may be applied across the second surface 708 subsequent the welding to cover any burs. This insulating material may also be applied to protect components, such as a separator, from contacting any formed burs, which may cut or tear the set of electrodes materials.

Additionally along second surface 708 may be included an active material 710, such as an anode active material. The active material 710 may be located adjacent a portion of current collector 705 to which first electrode tab 120 is coupled, and may be distributed a distance from first electrode tab 120 to be at least partially separated. The separation may be associated with the insulating material 715, which may be positioned proximate the active material 710, and may contact or overlap active material 710. In some embodiments, insulating material 715 may be extended in both lateral directions along second surface 708 beyond a portion of current collector 705 to which first electrode tab 120 is coupled, and may be extended further in a direction towards active material 710. For example, as illustrated, insulating material 715 may extend a first distance along current collector 705 in a first direction along second surface 708 to a first end 716 of insulating material 715.

Insulating material 715 may also extend a second distance along current collector 705 in a second direction along second surface 708 to a second end 718 of insulating material 715. The second direction may be opposite the first in embodiments, and the second direction may be towards active material 710, which may be distributed on current collector 705. The second distance may be greater than the first distance as illustrated, and the second distance may extend towards active material 710. The second distance may extend within about 5 mm of active material 710, and may extend up to about 4 mm of active material 710, up to or about 3 mm, up to or about 2 mm, up to or about 1 mm, up to or about 0.5 mm, or less in embodiments. In some embodiments insulating material 715 may extend in the second direction to contact or overlap a portion of active material 710. By extending in the second direction further towards active material 710, current collector 705 may be reinforced by the insulating material 715, and may be less prone to tearing during events such as a drop.

Figure 8:
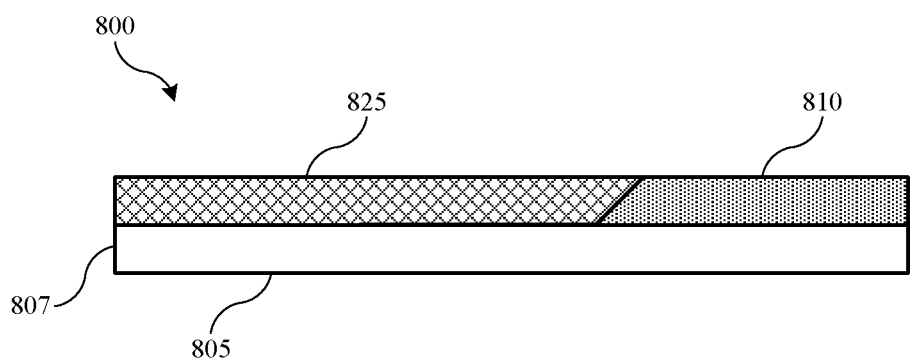
FIG. 8 shows a schematic cross-sectional view of a portion of an electrode according to embodiments of the present technology.

FIG. 8 shows a schematic cross-sectional view of a portion of an electrode 800 according to embodiments of the present technology. Electrode 800 may be or include a cathode current collector 805, which may include a cathode active material 810 positioned or disposed on a portion of the cathode current collector 805. In embodiments, electrode 800 may illustrate an end portion of a cathode current collector that may be included in a rolled configuration such as previously described.

During a drop or other event, an outer portion of the set of electrodes, which may be a portion of the outer winding, may tear. In embodiments in which the outer winding is a portion of the anode foil, the anode foil may tear producing a relatively sharp edge, which may cut or otherwise perforate the separator allowing contact with the cathode current collector. Cathode current collector 805 may include an insulating tape 825 that may be used to cover any streaking of cathode active material 810, and insulating tape 825 may extend over or overlap a portion of cathode active material 810 along cathode current collector 805. In some embodiments, insulating tape 825 may be extended in a direction opposite cathode active material 810 to or towards an exterior edge 807 along a length of cathode current collector 805. The battery may be rolled in a direction along a length of the current collectors, and thus insulating tape 825 may extend to an outer edge of the cathode current collector 805, which may be at the outermost winding of the cathode current collector 805. By extending insulating tape 825 to an outermost edge, or exterior edge, along a length of the cathode current collector 805, the current collector may be better protected against contact with an anode current collector that may have punctured the separator along an outer wind of the set of electrodes.

Figure 9A:
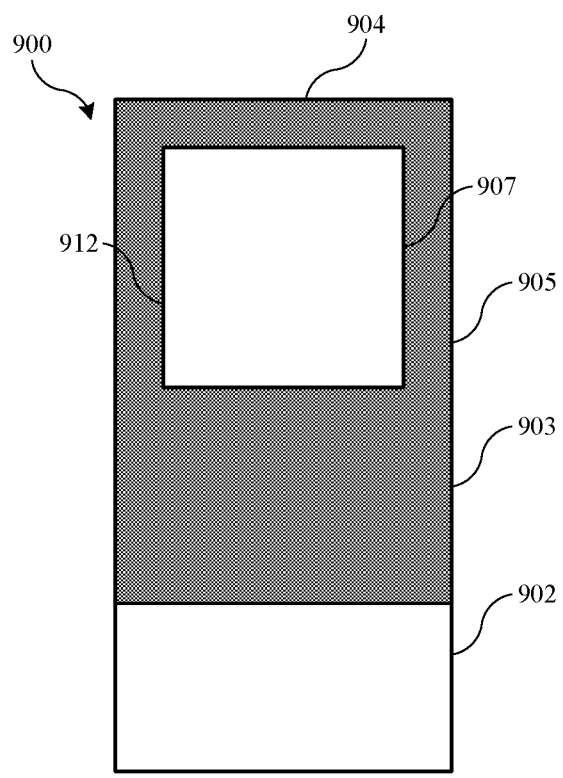
FIGS. 9A-9C show schematic plan views of electrode tabs of an energy storage device according to embodiments of the present technology.
Figure 9B:
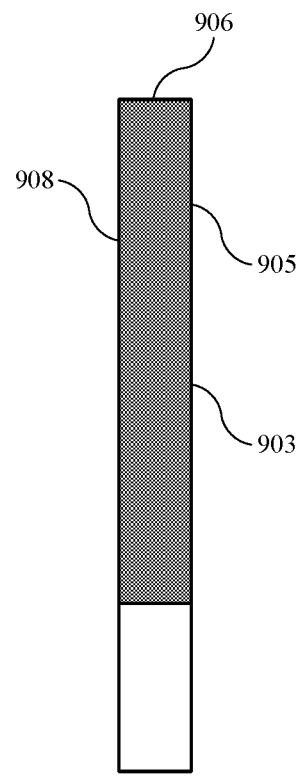
Figure 9C:
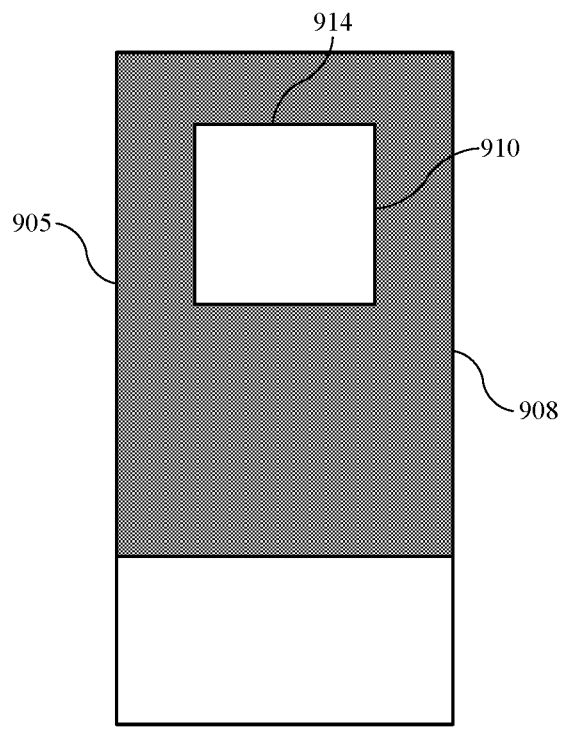

FIGS. 9A-9C show schematic views of electrode tabs of an energy storage device according to embodiments of the present technology. The electrode tabs may be associated with any of the previous batteries or battery cells as previously described, and may include any of the components of the cells. For example, the electrode tabs may be an anode tab or a cathode tab, and may be coupled with a portion of the battery housing, or a particular component of the battery, such as the cap. The electrode tabs may include any of the features or characteristics previously described above with respect to the electrode tabs. In some embodiments, electrode tab 900 may be a portion of an electrode tab coupled with a cap as previously described, although the electrode tab may be either a cathode associated tab or an anode associated tab, for example. Electrode tab 900 may be coupled with a first surface of the cap, such as previously described, and may be welded, bonded, fused, adhered, or otherwise coupled with the cap.

Similar to embodiments previously described, the electrode tab 900 may be characterized by a planar surface structure, and may be rectilinear in shape or geometry. In other embodiments, different shapes may be used, such as rounded, curved, or otherwise modified to couple with a surface of a cap or component of the battery, which may operate as a terminal. Electrode tab 900 may be coupled with a set of electrodes at a first end of the tab, as previously illustrated, and may be coupled with a surface of the cap or other component at a second end of the electrode tab. FIG. 9A may show second end 902 of electrode tab 900. The second end 902 of electrode tab 900 may extend to an exterior edge 904 of the electrode tab, which may be proximate the coupling with the cap. As illustrated, a portion of second end 902 of electrode tab 900 may be contained within an insulative material 905. Unlike conventional technologies which may partially cover or sheath an electrode tab extending up from the set of electrodes towards a coupling position, the present technology may extend coverage past the coupling position to an exterior end of the electrode tab.

As previously discussed, the corners or edges of electrode tab 900 may extend from the cap to which it is connected, and may extend towards a housing of the battery, which may be at a different potential. If the electrode tab 900 contacts the housing in such a scenario, an electrical short may occur. Where the housing may be characterized by a cylindrical shape and may have rounded sidewalls, corners of the electrode tab may be nearer the housing than other surfaces of the electrode tab. By insulating an end region of the electrode tab, an electrical barrier may be established between the components, which may protect the electrical integrity of the components from shorting if the battery or a device containing the battery is dropped, for example. Electrode tab 900 may also be characterized by chamfered edges as previously described with regard to electrode tab 125.

The electrode tab 900 may be coupled with the cap by welding, fusing, or otherwise bonding the components. Additionally, the electrode tab and cap may be in electrical communication so as to operate as a terminal of the battery. Insulative material 905 may increase resistance between these two components, or may cause bonding issues, and so in some embodiments, a window 907 may be defined by the insulative material along a first surface 903 of the electrode tab 900. The first surface 903 may be a surface to be coupled with the cap, and the window may be defined to expose a portion 912 of electrode tab 900. The electrode tab 900 may be coupled with a cap at the exposed portion 912, which may be exposed through the insulative material 905 at window 907.

Window 907 may not expose the entire first surface 903 of electrode tab 900 at second end 902. Insulative material 905 may be maintained on all edges of window 907. As illustrated, the insulative material 905 may extend along the first surface 903 entirely around window 907, which may maintain insulative material fully about corners at the exterior edge 904 of the electrode tab 900. Although illustrated as a rectangular window, it is to be understood that window 907 may be formed as any shape or geometry.

The electrode tab 900 may be characterized by additional surfaces including a second surface 908 as illustrated in FIG. 9B. Second surface 908 may be opposite first surface 903. Second surface 908 may also be covered by insulative material 905, which may cover all exposed surfaces at a peripheral end of the electrode tab. First surface 903 and second surface 908 may be joined with sidewalls, such as sidewall 906, which may extend between the first surface 903 and the second surface 908. As illustrated, sidewall surface 906 may also be contained or covered by insulative material 905. The insulative material may be or include a tape, polymer, or other insulative material that may be applied or coated to the electrode tab 900 at second end 902. Window 907 may be cut out from applied insulative material, or the application process may form the window during application of the insulative material.

FIG. 9C illustrates another view of electrode tab 900, which may show second surface 908. As illustrated, second surface 908 may also include coverage or coating of insulative material 905, which may extend fully across second surface 908 in embodiments. Additionally, a second window 910 may be defined in the insulative material 905 along the second surface 908 to expose a second portion 914 of electrode tab 900. When formed, second window 910 may be positioned relative to first window 907. For example, second window 910 may be located on second surface 908 opposite a position on first surface 903 at which window 907 has been defined. The second window 910 may allow welding from below the electrode tab 900 at second surface 908 to join or couple first surface 903 with the cap. The second window 910 may have any of the characteristics described above for first window 907, and may be similar in shape, size, formation, or configuration. In some embodiments, second window 910 may be larger or smaller than first window 907. Additionally, although window 907 may be formed during application of the insulation material, in some embodiments second window 910 may be formed during the welding or coupling process. For example, window 910 may not be formed on second surface 908. However, a welding process may apply heat, current, or some other energy from second surface 908 to couple first surface 903 to a cap. The welding process may burn, cut, or otherwise remove insulative material 905 from second surface 908, which may produce a window 910 and expose a second portion 912 of electrode tab 900. By insulating the electrode tab 900 along exterior edges of the tab, further protection from shorting may be provided during events which may shift or move components within the battery.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s) ", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery comprising:
 a housing characterized by a first end and a second end opposite the first end, wherein the housing comprises a circumferential indentation proximate the first end, wherein the housing defines a first interior region between the first end and the circumferential indentation, and wherein the housing defines a second interior region between the circumferential indentation and the second end;
 a cap at least partially contained within the first interior region of the housing, wherein the cap is characterized by a first surface facing into the housing and a second surface facing out from the housing;
 a set of electrodes located within the housing, wherein the set of electrodes is positioned within the second interior region of the housing, wherein the set of electrodes includes a first electrode and a second electrode, the second electrode comprising a tab that comprises chamfered corners and is at least partially covered by an insulative material extending about the tab, wherein the tab is coupled with the first surface of the cap such that the chamfered corners recess an exterior edge of the tab within a diameter of the cap on the first surface, and wherein a window is formed through the insulative material exposing a portion of the tab facing the cap.

2. The battery of claim 1, wherein the set of electrodes includes a separator defining a height of the set of electrodes, and wherein a first insulator is positioned within the housing in contact with the separator.

3. The battery of claim 2, wherein the second electrode extends through the first insulator.

4. The battery of claim 1, wherein the first electrode is coupled with a surface of the housing within the second interior region of the housing.

5. The battery of claim 4, wherein the first electrode is welded to the surface of the housing.

6. The battery of claim 5, wherein the first electrode is spot welded to the surface of the housing, and wherein each spot is formed at a projection defined by the first electrode.

7. The battery of claim 1, wherein the tab of the second electrode is coupled with the first surface of the cap with a spot weld characterized by a triangular weld pattern.

8. The battery of claim 7, wherein a single spot of the spot weld is formed extending into an edge region of the tab defined by the chamfered corners.

9. The battery of claim 1, further comprising a second insulator disposed at a base of the housing.

10. The battery of claim 1, wherein the set of electrodes comprise a coupling material extending about the set of electrodes.

\* \* \* \* \*